Oct. 23, 1928.
G. A. LUNZ
1,689,038
SPRING SUSPENSION FOR VEHICLES
Filed March 30, 1927    2 Sheets-Sheet 1
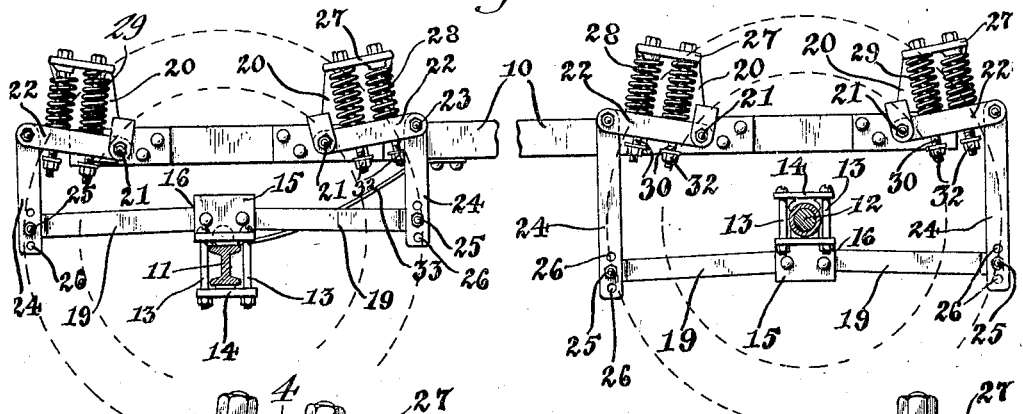
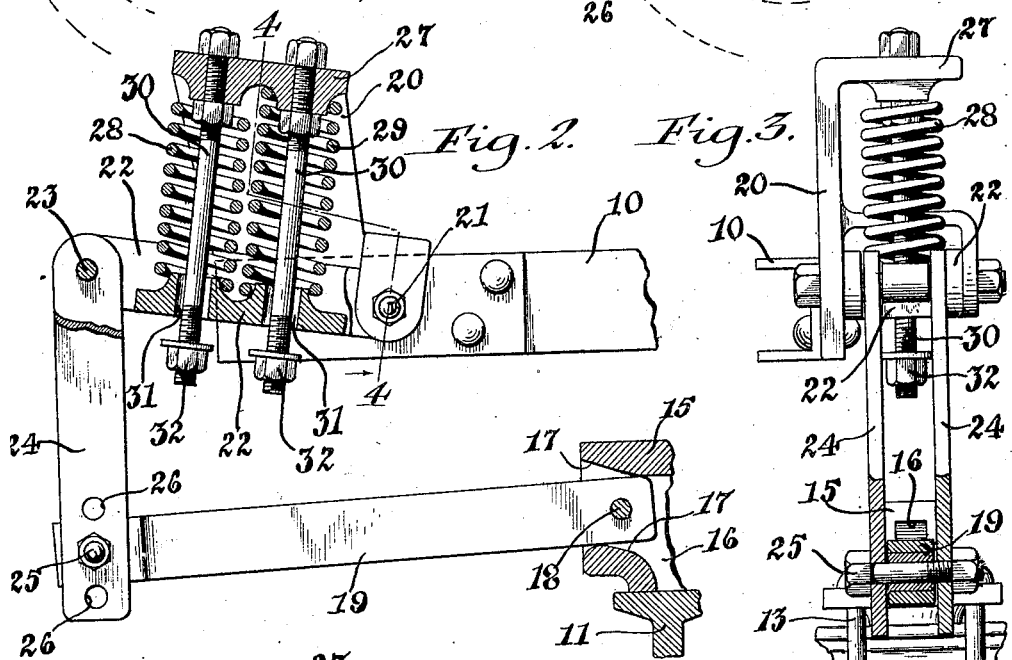
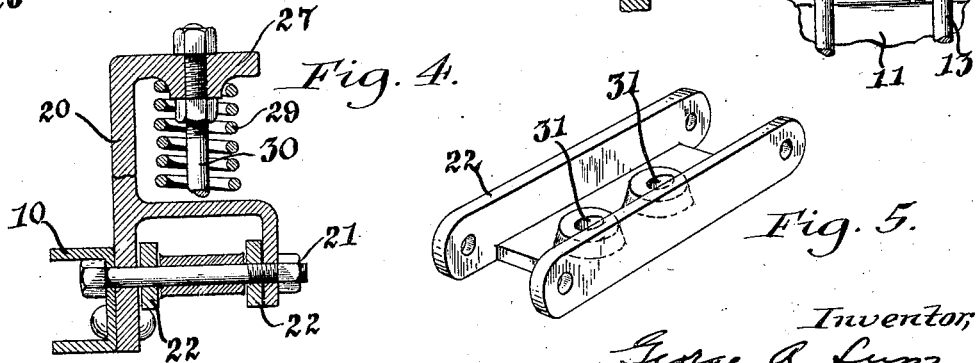
Inventor,
George A. Lunz,
by Geyer & Geyer
Attorneys.

Oct. 23, 1928.
G. A. LUNZ
1,689,038
SPRING SUSPENSION FOR VEHICLES
Filed March 30, 1927  2 Sheets-Sheet 2
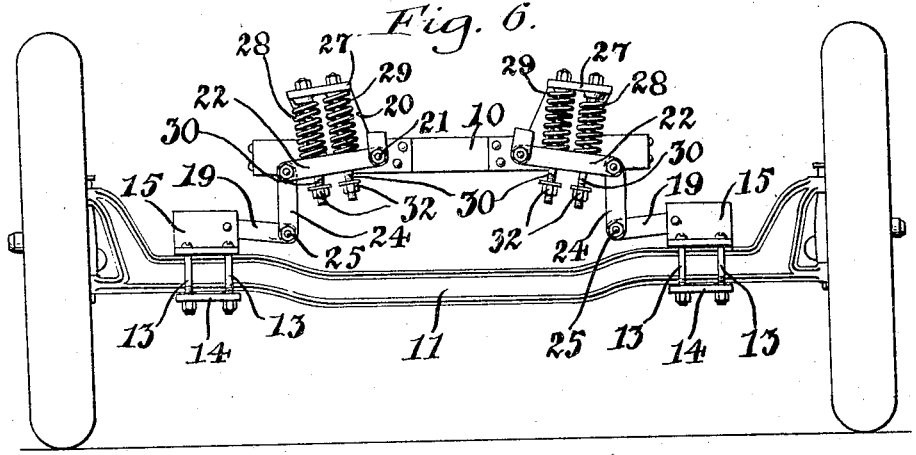
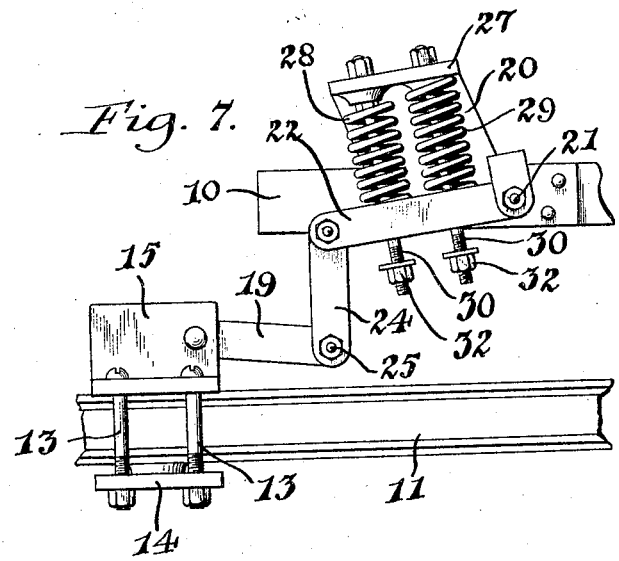
Inventor,
George A. Lunz,
by Geyer & Geyer
Attorneys.

Patented Oct. 23, 1928.

1,689,038

UNITED STATES PATENT OFFICE.

GEORGE A. LUNZ, OF BUFFALO, NEW YORK.

SPRING SUSPENSION FOR VEHICLES.

Application filed March 30, 1927. Serial No. 179,638.

This invention relates to improvements in the spring suspension means for connecting the frame and axle of automobiles and other vehicles.

One of its objects is the provision of a spring suspension mechanism which is designed to insure easy and comfortable riding to the occupants of the vehicle and which will effectually absorb any shocks due to the vehicle striking holes or obstructions in the roadway and automatically check the rebound action of the body relative to the axle.

Another object of the invention is to provide a spring suspension of this character which is simple and inexpensive in construction and whose parts are so organized and arranged that they may be readily adjusted to meet the requirements of different body-weights and car designs.

In the accompanying drawings:—

Figure 1 is a sectional side view of a vehicle-chassis showing my invention applied thereto. Figure 2 is an enlarged sectional side view of one of the spring suspension units. Figure 3 is an enlarged front end view thereof, partly in section. Figure 4 is a transverse section on line 4—4, Fig. 2. Figure 5 is a perspective view of one of the members of the unit. Figure 6 is a front view of a vehicle showing the invention disposed transversely thereof. Figure 7 is an enlarged fragmentary front view of one of the units shown in Fig. 6.

Similar characters of reference indicate corresponding parts throughout the several views.

In the embodiment of the invention shown in Figs. 1–5 inclusive, the suspension units are disposed lengthwise of the vehicle-chassis, these units being designed to replace the customary leaf spring suspension now in common use in connection with automotive construction. The numeral 10 indicates the frame of the vehicle to which the body is attached in the usual manner, and 11, 12 indicate the front and rear axles, respectively. The suspension units are arranged in pairs at the opposite sides of the frame and at the front and rear ends thereof between the frame and the axles. Inasmuch as the several units are identical in construction, a description of one will suffice for all.

Applied to the axle and fixed thereto by bolts 13 is a saddle or bracket 14 having an extension 15 containing an opening 16 disposed lengthwise thereof, the outer ends of the top and bottom walls of such opening being preferably inclined upwardly, as seen at 17 in Fig. 2. Fulcrumed on pivot pins 18 in the inclined end portions of the bracket-opening 16 are oppositely-facing vertically-swinging levers 19 each of which is normally prevented from swinging below a predetermined position by its upper and lower edges on each side of its pivot bearing against the opposing inclined walls 17 of the bracket-opening, but which are free to swing upwardly toward the frame. Hanger brackets 20, 20 are attached to the frame at approximately equal distances fore and aft of the axle 11 or 12 and fulcrumed at 21 on said hanger brackets are vertically-swinging members or cushioning plates 22 which face in opposite directions away from the axle and which are pivotally connected at 23 to the upper ends of vertical tie bars or links 24, the lower ends of the latter being connected by pivot bolts 25 to the free ends of the companion levers 19. The connection between the latter and the links 24 is preferably adjustable to suit varying conditions and to this end said levers may be provided with a series of openings 26.

At its upper end each hanger bracket 20 is provided with an outwardly-directed flange or abutment 27 which is disposed in spaced relation to and directly over the companion swinging member 22. Cushioning elements, preferably consisting of coil springs 28, 29 are interposed between the bracket-flange and said member 22. Attached to and depending from the bracket-flange 27 are guide stems or bolts 30 which pass centrally through the springs and through openings 31 in the cushioning plate 22. At their lower ends, these bolts have nuts 32 which constitute adjustable stops for limiting the downward-swinging movement of the cushioning plate relative to the vehicle-frame. In the drawings, two coil springs 28, 29 are employed in connection with each suspension unit, the spring 28 being normally inactive and free from engagement with the bracket-flange 27, while the spring 29 is constantly active and carries the normal load of the vehicle. For abnormal loads, the normally inactive spring 28 comes into play and assists its companion spring in carrying the load and absorbing the shocks incident to driving.

In order to maintain the axles 11, 12 in proper alinement relative to the frame 10, bracing or distance members 33 are employed, such members being located on each side of the frame and connected at one end thereto and at the other end to the respective axles.

In the embodiment of the invention shown in Figs. 6 and 7, the suspension units are disposed transversely of the frame and are of the same construction and operate in substantially the same way as those just described. In this case, however, the vertically-swinging levers 19 fulcrumed on the axle-brackets 14 may be much shorter than those of the other arrangement.

In the normal position of the parts shown in the drawings, the vehicle-body is yieldingly supported on the springs 29 of the various suspension units arranged at the front and rear ends of the vehicle. When supporting heavy loads, the springs 29 are compressed to such an extent that the companion springs 28 are rendered active to also support the load. Thus, this improved suspension mechanism has been so designed that the spring tension utilized is in proportion to the load carried by the vehicle. In this normal position of the parts above referred to, the lower levers 19 are rigidly held against swinging downwardly, while the cushioning plates 22 and connecting links 24 are free to rock relatively to one another in response to the movement of the vehicle-frame toward and from the axles. The setting of the stop nuts 32 on their bolts 30 checks any undue upward displacement of the frame, while the downward movement thereof is yieldingly resisted by the springs 28, 29; such downward movement of the frame results in a relative folding of the plates 22 and links 24, the former swinging upwardly on their pivots 21 to compress the springs.

Should the vehicle wheels encounter a hole in the pavement, the axle would drop or recede from the frame and the inner ends of the levers 19 would necessarily move therewith and assume a more or less upwardly inclined position relative to the frame. This movement, however, will not be transmitted to the vehicle-frame and the cushioning springs will not be affected. Upon the return of the axle to its normal position relative to the frame, the springs 28, 29 function to check the rebound of the vehicle-body and absorb the shocks incident thereto. When the wheels strike a bump or other obstruction in the roadway a reversal of this action takes place, the springs acting first to absorb the shocks and check the upward displacement of the body relative to the axle after which they return to their normal load-sustaining position.

I claim as my invention:—

1. In a motor vehicle, the combination with the chassis thereof including a frame and axle, of resilient suspension means for connecting the frame and axle, comprising a pair of vertically-movable members disposed one above the other in substantially parallel relation one being fulcrumed on the axle and the other being fulcrumed on the frame, means for connecting the free ends of said members to each other, and cushioning means applied to one of said members for resisting relative movement of the frame and axle.

2. In a motor vehicle, the combination with the chassis thereof including a frame and axle, of resilient suspension means for connecting the frame and axle, comprising a pair of vertically-swinging members disposed one above the other in substantially parallel relation one being fulcrumed on the axle and the other being fulcrumed on the frame, means for joining the free ends of said members to each other, an abutment on said frame in spaced relation to its vertically-swinging member, and a cushioning element disposed between said last-named parts.

3. In a motor vehicle, the combination with the chassis thereof including a frame and axle, of resilient suspension means for connecting the frame and axle, comprising a pair of overhanging, substantially parallel vertically-swinging members, one being fulcrumed on the axle and the other being fulcrumed on the frame, means for pivotally joining the free ends of said members to each other, an abutment on said frame in overhanging relation to its vertically-swinging member, and a coil spring interposed between said last-named parts.

4. In a motor vehicle, the combination with the chassis thereof including a frame and axle, of resilient suspension means for connecting the frame and axle, comprising a pair of vertically-swinging members, one being fulcrumed on the axle and the other being fulcrumed on the frame, means for pivotally joining the free ends of said members to each other, means for positively limiting the swinging of axle member in one direction and means for yieldingly resisting the movement of the frame member in the opposite direction.

5. In a motor vehicle, the combination with the chassis thereof including a frame and axle, of resilient suspension means for connecting the frame and axle, comprising a pair of vertically-swinging members facing in the same direction, one being fulcrumed on the axle and the other being fulcrumed on the frame, a link connecting the free ends of said members, means for positively limiting the swinging of one of said members in a downward direction, an abutment on said frame in spaced relation to its vertically-swinging member, and a cushioning element disposed between said parts.

6. In a motor vehicle, the combination with the chassis thereof including a frame and axle, of resilient suspension means for connecting the frame and axle, comprising a pair of vertically-swinging members, one being fulcrumed on the axle and the other being fulcrumed on the frame, means for pivotally joining the free ends of said members to each other, separate means for positively limiting the downward movement of said members, and unitary means for yieldingly resisting the movement of said members in the opposite direction.

7. In a motor vehicle, the combination with the chassis thereof including a frame and axle, of resilient suspension means for connecting the frame and axle, comprising brackets attached to the frame and axle, respectively, vertically-swinging members fulcrumed on said brackets and facing in the same direction, means for pivotally joining the free ends of said members to each other, said axle-bracket having means for limiting the downward-swinging movement of its member and said frame bracket having a flange overhanging its member, and a coil spring interposed between said last-named member and said bracket-flange.

8. In a motor vehicle, the combination with the chassis thereof including a frame and axle, of resilient suspension means for connecting the frame and axle, comprising brackets attached to the frame and axle, respectively, vertically-swinging members fulcrumed on said brackets and facing in the same direction, means for pivotally joining the free ends of said members to each other, said axle-bracket having means for limiting the downward-swinging movement of its member and said frame bracket having a flange overhanging its member, a guide stem fixed to said bracket-flange and extending through an opening in the companion swinging member, a coil spring interposed between the latter and said bracket-flange, and a stop element on said guide stem for limiting the downward-swinging movement of said last-named member.

9. In a motor vehicle, the combination with the chassis thereof including a frame and axle, of resilient suspension means for connecting the frame and axle, comprising brackets attached to the frame and axle, respectively, a pair of vertically-swinging members fulcrumed on the axle-bracket, the latter having stops for limiting the downward movement of its members, a pair of companion vertically-swinging members fulcrumed on said frame-bracket, the latter having stops for limiting the downward movement of its members, means for pivotally joining the free ends of the axle-members to the corresponding ends of the frame-members, the frame-brackets having flanges at their upper ends overhanging said frame-members, and cushioning means interposed between the latter and the flanges of said frame-brackets.

10. In a motor vehicle, the combination with the chassis thereof including a frame and axle, of resilient suspension means for connecting the frame and axle, comprising a pair of vertically-swinging members disposed one above the other in substantially parallel relation one being fulcrumed on the axle and the other being fulcrumed on the frame, means for joining the free ends of said members to each other, stop means for limiting the swinging of the axle member in a downward direction, an abutment on said frame in spaced relation to its vertically-swinging member, and a pair of coil springs interposed between said last-named parts, one of said springs being normally active to carry the vehicle-load and the other spring being normally inactive, the latter being active in absorbing shocks incident to the rebound action of the frame and in sustaining abnormal loads.

GEORGE A. LUNZ.